United States Patent Office 3,396,128
Patented Aug. 6, 1968

3,396,128
METHOD FOR PROMOTING CRYSTALLIZATION OF UNSATURATED POLYESTER RESINS
Katumi Matumoto, Kyoto, Takao Iwai, Kashiwara, and Yasunari Fujioka, Kobe, Japan, assignors to Takeda Chemical Industries, Ltd., Osaka, Japan
No Drawing. Filed May 1, 1963, Ser. No. 277,137
Claims priority, application Japan, May 4, 1962, 37/18,415
9 Claims. (Cl. 260—22)

The present invention relates to a method for promoting crystallization of unsaturated polyester resin and more particularly to a method for promoting crystallization of unsaturated polyester resin, which comprises adding one or more kinds of metal salts of higher fatty acid to unsaturated polyester resin.

As is widely known, the resin formed by the reaction of symmetrical acids such as polymethylene dicarboxylic acid, terephthalic acid, fumaric acid as the acid components, with symmetrical glycols such as polymethylene glycol, 2,2-dimethyl propanediol-1,3 as the glycol components, is easily crystallizable and the product obtained by dissolving copolymerizable monomer in the above resin is also crystallizable at room temperature or below and gives wax-like products in various states.

Liquid resins are generally preferred in the low-pressure laminating and molding processes in which unsaturated polyesters are used. They give good impregnation of glass reinforcing material and will flow into all parts of a mold cavity. Limited crystallinity at room temperature, however, may be desirable to improve ease of handling in shipping. This property is also of value in the resins used in preimpregnated glass cloth or mat which is stored for later use. Preimpregnated materials prepared by impregnating the unsaturating into for example glass mat, natural or synthetic fiber and paper by various means, for instance, with curing can be designed for use for general purposes covering a wide range because of long storage-life, readiness to shaping, etc.

On the other hand, it is often the case that unsaturated polyester resin is hardly brought into the crystalline state from the molten state without being left for a considerably long time at room temperature or even under cooling, which is one of the common properties observed in a high polymer.

Therefore, it is hardly avoidable to take a considerably long period from the time of impregnation of unsaturated polyester resin into suitable substances as mentioned above to the time when so impregnated resin becomes solid, which makes the handling of the resulting preimpregnated material inconvenient, for example, requiring a large area for operation.

These disadvantages must be improved, first of all, from the industrial point of view. Although many attempts were made to overcome the foregoing disadvantages, none, as far as the present inventors are aware, was entirely successful when carried into practice on an industrial scale.

As the result of the present inventors' study on a method for promoting crystallization of unsaturated polyester resin, free from the above-mentioned disadvantages, the present invention has now been accomplished.

The present invention has special utility in promoting crystallization of unsaturated polyester resin and in saving time required for production as well as simplifying the processes.

It is an object of the present invention to provide a method for promoting crystallization of unsaturated polyester resin. Among the further objects of the present invention is providing metal salt of higher fatty acid as the promoting agent for crystallization of unsaturated polyester resin.

The higher fatty acids which constitute the metal salts in the present invention, may be saturated or unsaturated and monobasic or polybasic. Further, the higher fatty acids may be substituted by one or more substituents such as hydroxyl group, so far as they do not disturb the crystallization.

As the higher fatty acids in the present invention, any kind of fatty acids may be put into use, so far as, in the form of metal salts, they promote crystallization of unsaturated polyester resins.

Among the higher fatty acids, there are for example enumerated caproic acid, capric acid, lauric acid, myristic acid, palmitic acid, stearic acid, arachidic acid, behenic acid, linolic acid, linolenic acid, oleic acid, rincinoleic acid, azelaic acid, sebacic acid and unpurified fatty acids obtained from tallow oil, castor oil or palm oil.

These fatty acids may be available in the form of the respective metal salts. As the metals, any kind of metals may be put to use, so far as they do not disturb the crystallization.

For example, there may be employed acid salts of metals such as sodium, potassium, magnesium, calcium, zinc, lead, aluminum and cadmium.

When a dicarboxylic acid is used as an acid in the present invention, the dicarboxylic acid can be used as monosalt or disalt. In case of disalt, the two two metals may be the same as or different from each other. Among metal salts of higher fatty acid which is most often put to use in the present invention, there may, for example, be mentioned potassium myristate, lead stearate, calcium stearate, potassium oleate and aluminum monostearate. The above-mentioned metal salts of higher fatty acids may be used solely or in mixture of two or more kinds.

The method of the present invention can be applied to resins of any kind or type, so far as they can crystallize at the neighbourhood of room temperature.

More concretely, there may, for example be mentioned the resin formed by the reaction of symmetrical acids such as polymethylene dicarboxylic acid, terephthalic acid, fumaric acid as the acid components, with symmetrical glycols such as polymethylene glycol, 2,2-dimethyl propanediol-1,3 as the glycol components. So formed resins may contain other kinds of polyester resins, alkyl resins, epoxy resins, allyl resins, etc.

The method of this invention may most profitably be applied to the resins which contain more than 60% of fumaric acid or ethylene glycol. As to the amount of the metal salt of higher fatty acid to be added to the resin, about 0.1–5.0 percent by weight relative to the resin used in generally sufficient for the purpose of the present invention, though it may vary with the kind of the resin to which the present invention is applied.

The time when the metal salt of higher fatty acid is added may suitably be decided so as to meet the object. For instance, it may be added to the reaction system at a suitable time in the course of preparing the objective unsaturated polyester resin, to the prepared resin before crystallization, or to the melted resin or the resin dissolved in a solvent in executing preimpregnating procedure.

In any case mentioned above, crystallization of unsaturated polyester resin can be promoted, and the same result can be brought about.

As described in detail above, crystallization of unsaturated polyester resin is remarkably promoted by the method of the present invention, and therefore when the method is applied to the preparation of preimpregnated material by dissolving the resin in fiber, paper, etc. in the molten state or as a solution in a suitable solvent, a large space is not necessary, there is no fear of staining of the product, and so the method of the present invention is advantageous from the industrial point of view.

The period of time required for crystallization is shown by numerals (minutes) obtained by counting the period of time during which 3 drops of resin melted at 100° C. placed on a clean aluminum plate exposed to an air bath come to show no tackiness. (This is the procedure used in all the working examples, hereinafter set forth, for determining the time required for crystallization).

In the following examples, all percentages are shown by weight.

Example 1

Unsaturated alkyd resin is prepared by the reaction of 116 parts by weight of fumaric acid with 68.2 parts by weight of ethylene glycol at 150–190° C. for 7 hours in an atmosphere of carbon dioxide. 39.2 parts by weight of maleic anhydride, 88.8 parts by weight of phthalic anhydride and 83.6 parts by weight of propylene glycol are reacted in the similar way as above. 10 parts by weight of the resulting alkyd resin, 25 parts by weight of diallyl phthalate and a small amount of hydroquinone are added to the initially prepared resin. The resulting unsaturated polyester resin requires 473 minutes for crystallization. Separately from the above process, potassium stearate is added to the same resin as above in molten state in an amount of 0.5% relative to the latter, whereupon the period of time required for crystallization of so prepared resin is remarkably shortened, i.e. 26 minutes.

Example 2

To the unsaturated polyester resin prepared in Example 1, three kinds of metal salt of higher fatty acids are added. The respective times required for crystallization are shown in the following Table 1.

TABLE 1

| Added metal salt of higher fatty acid | Amount of the addition | The time for crystallization |
| --- | --- | --- |
| Cadmium | 0.5 | 302 |
| Stearate | 1.0 | 286 |
| Aluminum | 0.5 | 221 |
| Monostearate | 1.0 | 222 |
| Lead | 0.5 | 199 |
| Stearate | 1.0 | 316 |

Example 3

To 100 parts by weight of the unsaturated polyester resin prepared in Example 1, 10 parts by weight of the alkyd resin prepared by the reaction of 118 parts by weight of succinic acid, 68.2 parts by weight of ethylene glycol and 30 parts by weight of triallyl cyanurate are added.

The resulting unsaturated polyester resin requires 310 minutes for crystallization.

On the other hand, when 1 percent of potassium stearate relative to the resin is added, crystallization of the resin requires only 50 minutes, and when 1 percent of potassium salt of fatty acid obtained from tallow oil relative to the resin is added, the period of time required for crystallization of the resin is further reduced to 19 minutes.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. A method of promoting crystallization, from non-crystalline state, of unsaturated polyester resin which is crystalline at room temperature, which consists essentially in incorporating from about 0.1 to 5.0 percent by weight of metal salt of higher fatty acid into the said unsaturated polyester resin prior to crystallization.

2. The method as claimed in claim 1, wherein higher fatty acid is stearic acid.

3. The method as claimed in claim 1, wherein higher fatty acid is myristic acid.

4. The method as claimed in claim 1, wherein higher fatty acid is palmitic acid.

5. The method as claimed in claim 1, wherein higher fatty acid is fatty acid obtained from tallow oil.

6. The method as claimed in claim 1, wherein the metal salt is a member selected from the group consisting of sodium salt, potassium salt, calcium salt, lead salt and cadmium salt.

7. A method of promoting crystallization, from non-crystalline state, of unsaturated polyester resin which is crystalline at room temperature, which consists essentially in incorporating from 0.1 to 5.0 percent by weight of metal salt of higher fatty acid into the said unsaturated polyester resin in molten state prior to crystallization.

8. A method of promoting crystallization, from non-crystalline state, of unsaturated polyester resin which is crystalline at room temperature and which is prepared by the reaction of a symmetrical polycarboxylic acid with a symmetrical glycol, which consists essentially in incorporating from about 0.1 to 5.0 percent by weight of metal salt of higher fatty acid into the said unsaturated polyester resin prior to crystallization.

9. In the method of converting unsaturated polyester resin which is crystalline at room temperature from the non-crystalline to the crystalline state by crystallization, the improvement according to which the crystallization of the unsaturated polyester resin is effected in admixture with from about 0.1 to 5 percent by weight of metal salt of higher fatty acid, whereby the crystallization is promoted and the time of crystallization is shortened.

References Cited

UNITED STATES PATENTS

| 3,219,604 | 11/1965 | Fischer | 260—863 |
| 2,642,410 | 6/1953 | Hoppens | 260—860 |
| 2,795,563 | 6/1957 | Low | 260—22 |
| 2,939,854 | 6/1960 | Christenson | 260—22 |
| 3,002,942 | 10/1961 | Zotetbrood | 260—22 |
| 3,179,530 | 4/1965 | Erickson et al. | 260—22 |
| 3,196,118 | 7/1965 | Peters | 260—22 |

FOREIGN PATENTS

| 644,287 | 10/1950 | Great Britain. |
| 815,084 | 12/1955 | Great Britain. |

OTHER REFERENCES

Chatfield, Varnish Constituents, Leonard Hill Limited, London, 1953, 868 pages, pp. 285, 529, 530, 536, 539, 542–544, 550, 561, 565, 569 and 574 relied upon (copy in Scientific Library).

Bjorkstein, Polyesters and Their Applications, Reinhold Publishing Corp., New York, 1956, 618 pages, p. 172 of interest (copy in Scientific Library).

DONALD E. CZAJA, *Primary Examiner.*

R. W. GRIFFIN, *Assistant Examiner.*